United States Patent Office 3,245,989
Patented Apr. 12, 1966

3,245,989
3-AMINOPHENYL-5-AMINOLOWERALKYL-1,2,4-OXADIAZOLES
Giuseppe Palazzo, Rome, Italy, assignor to Aziende Chimiche Riunite Angelini Francesco, Rome, Italy, a corporation of Italy
No Drawing. Filed May 31, 1963, Ser. No. 284,359
Claims priority, application Italy, Dec. 15, 1962, 24,702/62, Patent 30,008
6 Claims. (Cl. 260—247.2)

The copending U.S. application Ser. No. 56,097, filed September 15, 1960, and now Patent No. 3,141,019, relates to a new group of 1,2,4-oxadiazoles of the general Formua I:

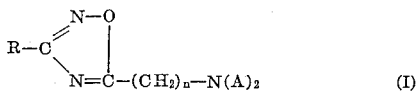    (I)

wherein R represents a member of the class consisting of aryl, arylalkyl, substituted aryl and substituted arylalkyl radicals, $n$ is an integer from 1 to 4 and $(A)_2$ represents a member of the class consisting of hydrogen, alkyl radicals, alkylene radicals, oxaalkylene radicals and azaalkylene radicals, which may form together a ring.

The aforementioned application further relates to a method for producing the said 1,2,4-oxadiazoles.

In developing the aforementioned invention, it has now been found that new derivatives of 1,2,4-oxadiazole may be prepared according to the main application, which derivatives have the general Formula II:

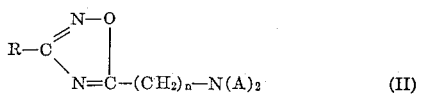    (II)

wherein $n$ is 1 or 2, A has the above-mentioned meaning, and R represents a radical selected from the group consisting of:

α-alkyl- and α,α-dialkyl-substituted benzyl radicals;
Tetrahydronaphthyl radicals;
o-Alkoxy-substituted phenyl radicals;
Phenyl radicals substituted at a meta- or para-position with amino, N-alkylamino or N-acylamino groups.

The invention also includes non-toxic acid addition salts of the compounds of Formula II.

Examples of α-alkyl- and α,α-dialkyl-substituted benzyl radicals include α-methyl-benzyl, α-ethyl-benzyl, α-propyl-benzyl, α-methyl-α-ethylbenzyl groups.

An example of a tetrahydronaphthyl radical is a 1,2,3,4-tetrahydronaphthyl-1 group.

An example of an o-alkoxy-substituted phenyl radical is an o-methoxy-phenyl group.

Examples of phenyl radicals m- or p-substituted with amino, N-alkyl-amino or N-acyl-amino groups include m- and p-amino-phenyl, m- and p-methylamino-phenyl, m- and p-ethylamino-phenyl, m- and p-acetylamino-phenyl, m- and p-butyrylamino-phenyl groups, and the like.

The new compounds of the general Formula II may be prepared according to the method of the main application, which comprises reacting amidoxime derivatives having the general Formula III:

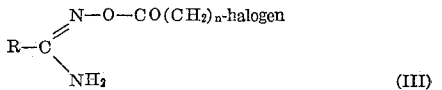    (III)

wherein R and $n$ have the above-mentioned meanings, with amines having the general formula $HN(A)_2$, wherein A has the above-specified meaning, and then isolating the resulting oxadiazoles. Alternatively, according to one embodiment of the above method, halo-acyl amidoxime derivatives (III) may be cyclized to haloalkyl-oxadiazoles (IV):

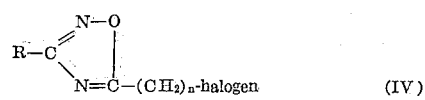    (IV)

which, in turn, may be reacted with said amines of the general formula $HN(A)_2$. A further embodiment of the above-described method comprises the steps of reacting an amidoxime of the general Formula V:

    (V)

with a dialkylamino-carboxylic acid chloride or a hydrohalide thereof having the general Formula VI:

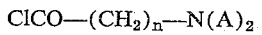

$$ClCO—(CH_2)_n—N(A)_2$$

and isolating the resulting oxadiazoles, R, $(A)_2$ and $n$, in the Formulae IV, V and VI, having the same meanings as defined in the general Formula III. When, in the new compounds according to the present invention, R represents a phenyl group substituted in a meta- or para-position by an amino, N-alkylamino or N-acylamino radical, this radical may be present before ring closure, possibly, as a grouping which may be converted into an amino-group (such as, a nitro-group and an acetamido-group), or may be substituted after the oxadiazole ring has been closed, for example, through nitration followed by reduction.

Nitration may be carried out by treating a solution of the instant compound in concentrated $H_2SO_4$ with a $H_2SO_4$–$HNO_3$ mixture. Reduction of the resulting nitro-group may be achieved using either chemical (stannous chloride in an acidic medium, or sodium sulphide in an alkaline medium) or catalytic (hydrogen or Raney-Ni) procedures.

Nitration may occur in a different position depending on the substituent on the 5-carbon atom in the oxadiazole ring. Accordingly, 3-phenyl-5-chloromethyl- and 3-phenyl-5-β-diethylaminoethyl-1,2,4-oxadiazole may be substituted almost exclusively in the meta-position. The nitration of 3-phenyl-5-diethylaminomethyl- and 3-phenyl-5-morpholinomethyl-1,2,4-oxadiazole yield a mixture of about equal amounts of the m-nitro- and the p-nitro-derivative, this latter being easily separable owing to its lower solubility.

Amido-derivatives may be prepared according to well-known methods by acylation with fatty acid chlorides or fatty acid anhydrides. A very suitable procedure for the preparation of N-alkyl-derivatives is the alkylation of the N-tosyl derivatives followed by detosylation.

The products according to this invention have been tested for their pharmacological activity, particularly for toxicity, behaviour effects, and anticonvulsant, analgesic and antiinflammatory action. All of the products have proved to be only slightly toxic to mouse and rat, in both of them the $LD_{50}$, as determined according to Lichfield and Wilcoxon, ranging from 400 to 800 mg./kg. i.p., and over 100 mg./kg. p.o. Even in very small doses, these compounds show sedative effects which, as the doses increase, gradually pass into myo-relaxing and hypnotic actions. As the dose/effect curve is particularly flat, they have an action more similar to that of tranquillizers than to that of hypnotics, such as barbiturates.

The following compounds have proved to be particularly active:

3-p-acetylaminophenyl-5-morpholinomethyl-1,2,4-oxadiazole,
3-m-acetylaminophenyl-5-morpholinomethyl-,1,2,4-oxadiazole,
3-p-N-methylaminophenyl-5-morpholinomethyl-1,2,4-oxadiazole,
3-m-N-ethylaminophenyl-5-morpholinomethyl-1,2,4,oxadiazole, All these derivatives, moreover, have a more or less strong anticonvulsant action, as ascertained by examining the activity thereof against electroshock (Swinyard et al.) and strychnine convulsions (120 mg./kg. s.c.). Some derivatives of this series show a very remarkable anticonvulsant action. Thus, for example, 3-p-N-methylaminophenyl-5-morpholinomethyl-1,2,4 - oxadiazole, in a dose of 25 mg./kg. i.p., prevents strychnine death, and 3-p-acetylaminophenyl-5-morpholinomethyl-1,2,4 - oxadiazole, in the same dose, prevents the electroshock effects. Several compounds according to this invention have an analgesic activity, as shown by tests using inflammatory pains (Arch. Int. Pharmacodyn., III, 409–419, Randall and Selitto, 1957; La Belle and Tislow, 1944).

On the contrary, the said compounds have proved to be inactive, when tested against non-inflammatory pains according to Woolfe and Macdonald (J. Pharmacol. exp., Ther., 80, 300, 307–1944).

Accordingly, it may be stated that the above examined derivatives do not have central analgesic activity, but rather they have an analgesic activity similar to that of acetylsalicyclic acid, this conclusion being supported by the fact that those derivatives, which are suitable for use in soothing inflammatory pains, at the same time act as antipyretics to the animal in which a fever has been developed with pyretogenous agents, and as antiinflammatory drugs, when tested according to Randall et al. (1957) or according to Meier, Schuler and Desaulles, 1950 (Experientia, 6, 469, 471). From a quantiative point of view, according to this latter test, the preferred compounds and, in addition, 3-p-aminophenyl-5-morpholinomethyl - 1,2,4-oxadiazole, are as active as aspirin in a dose ½ to ⅓ the active dose of aspirin.

The following examples illustrate the preparation of the new compounds according to this invention.

*Example I.—3-(o-methoxy)-phenyl-5β-diethylaminoethyl-1,2,4-oxadiazole hydrochloride*

A solution of 25 ml. of diethylamine in an equal volume of chloroform was added during 20–25 minutes to a solution of 25 g. of o-methoxy-O-β-chloropropionyl-benzamidoxime (prepared by reacting the corresponding benzamidoxime with β-chloropropionyl chloride) in about 200 ml. of chloroform, maintained at a temperature below 30–35° C. After the reaction mixture was boiled for 2 hours, cooled, washed with water (twice with 15 ml.) and dried on $CaCl_2$, the solvent was removed. The residue was dissolved in ether and treated with an ethereal solution of HCl to give 3-(o-methoxy)-phenyl-5β-diethylaminoethyl - 1,2,4 - oxadiazole hydrochloride, melting at 149–150° C.

*Analysis.*—Found: Cl=11.26%. $C_{15}H_{22}ClN_3O_2$ requires: Cl=11.37%.

*Example II.—3-p-amino-phenyl-5-diethylaminoethyl-1,2,4-oxadiazole*

9 g. of p-nitrobenzamidoxime, 7 g. of anhydrous $K_2CO_3$ and 100 ml. of anhydrous acetone were stirred and cooled in an ice-water bath. To the resulting suspension, 6.5 g. of chloropropionyl chloride in 30 ml. of acetone were slowly added. After the addition was completed, the reaction mixture was stirred for a further 2 hours, the inorganic salts were filtered and the acetone was evaporated. The residue was diluted with water, filtered and dried in a dessicator to give 9.4 g. of crude O-chloropropionyl-p-nitrobenzamidoxime (M.P. 131–4° C.) which could be employed as such in the following reaction. The analytically-pure product, after crystallization from alcohol, melted at 134–5° C.

A solution of 5 g. of diethylamine in 30 ml. of benzene was added during 15 minutes to a suspension of 9 g. of O-chloropropionyl-p-nitrobenzamidoxime in 100 ml. of anhydrous benzene, stirred and heated to 50° C. The resulting mixture was refluxed for 15 minutes, and then boiled for further 45 minutes on adding benzene and distilling off the azeotropic mixture at the same time. The reaction mixture was cooled and treated with water. The separated benzene layer was extracted with diluted HCl, made alkaline and extracted again with ether. From the dried ethereal solution, 7 g. of 3-p-nitrophenyl-5-diethylaminoethyl-1,2,4-oxadiazole hydrochloride were then obtained, M.P. 180° C. The analytically pure product, after crystallization from absolute alcohol, melted at 182° C.

32 g. of 3-p-nitrophenyl-5-diethylaminoethyl-1,2,4-oxadiazole were dissolved in 120 ml. of ethanol and heated to 50° C. A solution of 75 g. of $SnCl_2 \cdot 2H_2O$ in 75 ml. of concentrated HCl was then added. After the reaction mixture was heated for 15 minutes at 50° C., it was cooled, diluted with water, and filtered. The filtrate was made alkaline with $K_2CO_3$ and extracted with ether. The separated ethereal layer was washed and dried to give, after the solvent was evaporated, 24 g. of crude 3-p-aminophenyl-5-diethylaminoethyl-1,2,4-oxadiazole. This compound was characterized through the benzoyl-derivative (M.P. 80° C.). It was purified through the citrate (M.P. 120° C.), which was prepared in an alcoholic medium.

*Example III.—3-p-aminophenyl-5-morpholinomethyl-1,2,4-oxadiazole*

To a solution of 250 g. of p-acetaminobenzonitrile in 3700 ml. of ethanol at 60° C., were added 7 g. of hydroxylamine hydrochloride and then, drop by drop, a water-alcohol solution containing 55 g. of free hydroxylamine. After the addition was completed, the reaction mixture was heated for a further 2 hours at 60° C. to complete the reaction, and evaporated to dryness. The residue was crystallized from ethanol to give 244 g. of p-acetylaminobenzamidoxime melting at 180° C. The analytically pure product, after crystallization from alcohol, melted at 185° C.

A solution of 1.5 equivalents of chloroacetyl chloride in acetone was added while cooling to a stirred suspension of 193 g. of p-acetylaminobenzamidoxime and 1.5 equivalents of $K_2CO_3$ in anhydrous acetone. After the inorganic salts were filtered and the solvent was removed, the residue was diluted with water to obtain 190 g. of O-chloroacetyl-p-acetylaminobenzamidoxime, melting at 190° C. 258 g. of O-chloroacetyl-p-acetylaminobenzamidoxime were treated for 10 minutes at 152° C. with 900 ml. of dimethylformamide. After the reaction mixture was concentrated by vacuum to one-third of its original volume, and poured into 2000 ml. of water, the resulting precipitate of 3-p-acetylaminophenyl-5-chloromethyl-1,2,4-oxadiazole was recovered by filtration and dried in a desiccator to obtain 225 g. of crude product, which, after crystallization from methanol to obtain an analytically pure sample, melted at 199° C. 225 g. of 3-p-acetylaminophenyl-5-chloromethyl-1,2,4-oxadiazole were dissolved in a boiling anhydrous solution of 2000 ml. of benzene and 1000 ml. of tetrahydrofuran. 158 g. of morpholine were then added quite rapidly, and the reaction mixture was heated for 2.5 hours. After cooling, the resulting mixture was concentrated to dryness under reduced pressure, and the residue was treated with diluted HCl, filtered from the insoluble products, and made highly alkaline to precipitate 3-p-acetylaminophenyl-5-morpholinomethyl-1,2,4-oxadiazole, which, in turn, was filtered, washed and dried. Yield: 168 g. Analytically pure sample: M.P. 163° C.

10 g. of 3-p-acetylaminophenyl-5-morpholinomethyl-1,2,4-oxadiazole were digested for 20 minutes at 120° C. with 100 ml. of 20% $H_2SO_4$. The reaction mixture was then cooled and made alkaline to precipitate 3-p-aminophenyl-5-morpholinomethyl-1,2,4-oxadiazole which, after washing and drying, weighed 8.3 g. Analytically pure sample: M.P. 117° C.

*Example IV.—3 - m-aminophenyl-5-diethylaminomethyl-1,2,4-oxadiazole*

50 g. of 3-phenyl-5-chloromethyl-1,2,4-oxadiazole were added slowly to 200 ml. of concentrated $H_2SO_4$ while cooling. 45 ml. of $H_2SO_4$–$HNO_3$ mixture were then added at a temperature ranging from —5° to 0° C. After the addition was completed, the reaction mixture was stirred for a further ½ hour and poured into ice. The solid precipitate was filtered, dissolved in ether and washed with water. After the solvent was removed, 55 g. of crude 3 - m-nitrophenyl-5-chloromethyl-1,2,4-oxadiazole were obtained; M.P. 60° C. An analytically pure sample, after crystallization from alcohol, melted at 63° C.

To a solution of 50 g. of 3-m-nitrophenyl-5-chloromethyl-1,2,4-oxadiazole in 220 ml. of alcohol, maintained at 60° C., was added a hot solution of 170 g. of $SnCl_2 \cdot 2H_2O$ in 170 ml. of concentrated HCl. The resulting mixture was heated for a further 15 minutes at 60° C., cooled, diluted with water, filtered with fluted filter paper from the insoluble products, and made alkaline with 25% NaOH to give a precipitate which, in turn, was washed and dried. Thus 36 g. of 3-m-aminophenyl-5-chloromethyl-1,2,4-oxadiazole were obtained. An analytically pure sample, after crystallization from benzene-hexane, melted at 85° C.

To a boiling solution of 23 g. of 3-m-aminophenyl-5-chloromethyl-1,2,4-oxadiazole in 95 ml. of anhydrous benzene were added 17 g. of diethylamine in 20 ml. of benzene. The resulting mixture was refluxed for 45 minutes, cooled, washed with water and extracted with 2 N HCl. The free base, obtained by addition of $K_2CO_3$, was extracted with ether, washed and dried, and the solvent was removed to yield 22 g. of 3-m-aminophenyl-5-diethylaminomethyl-1,2,4-oxadiazole. The analytically pure amine dihydrochloride melted at 217° C.

*Example V.—3-p-butyrylaminophenyl-5-morpholinomethyl-1,2,4-oxadiazole*

25 g. of 3-phenyl-5-morpholinomethyl-1,2,4-oxadiazole were dissolved in 125 ml. of concentrated $H_2SO_4$ while cooling. 17 ml. of a $H_2SO_4$–$HNO_3$ mixture were then added at a temperature ranging from —5° to 0° C. while stirring. The resulting mixture was stirred for a further ½ hour and poured into ice. The reaction product was extracted with ether, washed and dried. On removing the solvent, a solid residue was obtained, consisting of a mixture of almost equal parts of 3-p-nitrophenyl-5-morpholinomethyl-1,2,4-oxadiazole and 3-m-nitrophenyl-5-morpholinomethyl-1,2,4-oxadiazole. On treating the above residue with 80 ml. of ethanol, 12.5 g. of substantially pure 3-p-nitrophenyl-5-morpholinomethyl-1,2,4-oxadiazole were recovered, whereas the isomer was dissolved. An analytically pure sample melted at 146° C.

25 g. of 3-p-nitrophenyl-5-morpholinomethyl-1,2,4-oxadiazole were refluxed with 200 ml. of methanol while stirring. A water-methanol solution containing 11.5 g. of NaHS was then added. After the addition was completed, the reaction mixture was heated for about ten minutes while distilling off the solvent, cooled and poured into water. The resulting precipitate was filtered, dissolved in diluted HCl and precipitated again by alkalizing with NaOH, to give 3-p-aminophenyl-5-morpholinomethyl-1,2,4-oxadiazole, which could be recrystallized from methanol. 16 g. of pure product were obtained.

6 g. of 3-p-aminophenyl-5-morpholinomethyl-1,2,4-oxadiazole and 30 ml. of butyric anhydride were heated at 80° C. for 20 minutes. After cooling and adding 100 ml. of anhydrous ether, the reaction mixture was filtered to yield 5.4 g. of 3-p-butyrylaminophenyl-5-morpholinomethyl-1,2,4-oxadiazole. A sample was converted with ethereal HCl into the hydrochloride, which, after crystallization from alcohol, melted at 245° C.

*Example VI.—3-p-ethylaminophenyl-5-morpholinomethyl-1,2,4-oxadiazole*

30 g. of 3-p-nitrophenyl-5-morpholinomethyl-1,2,4-oxadiazole were reduced with hydrogen in an autoclave at a pressure of about 40 atm. in the presence of 400 ml. of anhydrous dioxane and 7 ml. of Raney Ni. After the absorption was completed, the catalyst was filtered off, the solvent was removed, and the residue was dissolved in diluted HCl. The resulting solution was treated with a decolorizing charcoal and made alkaline to precipitate 3-p-aminophenyl-5-morpholinomethyl - 1,2,4 - oxadiazole. The thus obtained crude product, melted at 115° and could be employed as such in the following reaction. 30 g. of 3-p-aminophenyl-5-morpholinomethyl-1,2,4-oxadiazole, 22 g. of p-toluenesulphochloride and 105 ml. of anhydrous pyridine were heated at 50° C. for one hour. After cooling, the reaction mixture was adjusted to pH 7, and the resulting precipitate was filtered, washed and dried to give 44 g. of 3-p-tosylaminophenyl-5-morpholinomethyl-1,2,4-oxadiazole. An analytically pure sample, after crystallization from benzene, melted at 117° C.

20 g. of 3-p-tosylaminophenyl-5-morpholinomethyl-1,2,4-oxadiazole were dissolved in 170 ml. of boiling dry ethanol. A solution of 1.7 g. of Na in 30 ml. of ethanol was added slowly, followed by the periodic addition of 34 g. of ethyl iodide. The reaction mixture was cooled, filtered and concentrated under reduced pressure, and the residue was washed with water and crystallized from ethanol to give 3-p-tosylethylaminophenyl-5-morpholinomethyl-1,2,4-oxadiazole, melting at 113° C.

12.5 g. of 3-p-tosylethylaminophenyl-5-morpholinomethyl-1,2,4-oxadiazole, 60 ml. of glacial acetic acid, 60 ml. of 48% HBr and 2.8 g. of phenol were heated at 105° C. for one hour, while stirring. The reaction mixture was then cooled, filtered, made alkaline with NaOH and extracted with ether. The ethereal layer was washed and evaporated to dryness to give 8 g. of a reside consisting of 3-p-ethylaminophenyl-5-morpholinomethyl-1,2,4-oxadiazole, which, after recrystallization from benzene-hexane, melted at 94° C. The amine hydrochloride, crystallized from alcohol, melted at 216° C.

Employing the same techniques as set forth in the previous examples, the following intermediate compounds could be obtained:

3-p-aminophenyl-5-chloromethyl-1,2,4-oxadiazole; M.P. 115° C.;
3-p-tosylaminophenyl-5-diethylaminomethyl-1,2,4-oxadiazole; M.P. 110° C.;
3-p-tosylethylaminophenyl-5-diethylaminomethyl-1,2,4-oxadiazole citrate; M.P. 108° C.;
3-m-tosylaminophenyl-5-diethylaminomethyl-1,2,4-oxadiazole hydrochloride; M.P. 181° C.;
3-p-tosylmethylaminophenyl-5-morpholinomethyl-1,2,4-oxadiazole; M.P. 118° C.;
3-m-tosylaminophenyl-5-morpholinomethyl-1,2,4-oxadiazole; M.P. 145° C.;
3-m-tosylethylaminophenyl-5-morpholinomethyl-1,2,4-oxadiazole hydrochloride; M.P. 188° C.;
3-m-nitrophenyl-5-diethylaminoethyl-1,2,4-oxadiazole hydrochloride; M.P. 164° C.;

As well as the following 1,2,4-oxadiazoles having the above general Formula II:

3-(α-ethyl) benzyl-5-β-morpholinoethyl-1,2,4-oxadiazole, B.P. 145° C., 0.2 mm.; hydrochloride, M.P. 160–161° C.

Analysis: $C_{17}H_{24}ClN_3O_2$ requires: Cl=10.50%. Found: Cl=10.66%.

3-(α-methyl) benzyl-5-β-diethylaminoethyl-1,2,4,-oxadiazole;
3-(α-n-propyl) benzyl-5-β-diethylaminoethyl-1,2,4,-oxadiazole;
3-(α-methyl-α-ethyl) benzyl-5-β-diethylaminoethyl-1,2,4-oxadiazole;
3-[1 (1,2,3,4-tetrahydro) naphthyl]-5-β-diethylaminoethyl-1,2,4-oxadiazole;
3-p-aminophenyl-5-dimethylaminomethyl-1,2,4-oxadiazole, M.P. 81° C.; dihydrochloride, M.P. 204° C.;
3-p-acetylaminophenyl-5-dimethylaminomethyl-1,2,4-oxadiazole, M.P. 130° C.; hydrochloride, M.P. 242° C.;
3-p-aminophenyl-5-diethylaminomethyl-1,2,4-oxadiazole citrate, M.P. 119° C.;
3-p-acetylaminophenyl-5-diethylaminomethyl-1,2,4-oxadiazole, M.P. 104° C.; hydrochloride, M.P. 227° C.;
3-p-butyrylaminophenyl-5-diethylaminomethyl-1,2,4-oxadiazole, M.P. 90° C.; hydrochloride, M.P. 174° C.;
3-p-ethylaminophenyl-5-diethylaminomethyl-1,2,4-oxadiazole dihydrochloride, M.P. 198° C.;
3-m-acetylaminophenyl-5-diethylaminomethyl-1,2,4-oxadiazole, M.P. 78° C.;
3-m-ethylaminophenyl-5-diethylaminomethyl-1,2,4-oxadiazole dihydrochloride, M.P. 203° C.;
3-p-acetylaminophenyl-5-morpholinomethyl-1,2,4-oxadiazole, M.P. 163° C.; hydrochloride, M.P. 231° C.;
3-p-methylaminophenyl-5-morpholinomethyl-1,2,4-oxadiazole, M.P. 112° C.;
3-p-ethylaminophenyl-5-morpholinomethyl-1,2,4-oxadiazole, M.P. 94° C.;
3-m-acetylaminophenyl-5-morpholinomethyl-1,2,4-oxadiazole hydrochloride, M.P. 222° C.;
3-m-ethylaminophenyl-5-morpholinomethyl-1,2,4-oxadiazole dihydrochloride, M.P. 222° C.;
3-m-aminophenyl-5-diethylaminoethyl-1,2,4-oxadiazole citrate, M.P. 129° C.

I claim:

1. A compound selected from the group consisting of a 1,2,4-oxadiazole of the formula

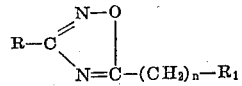

wherein R is a member selected from the group consisting of m-aminophenyl, p-aminophenyl, m-lower alkylaminophenyl, p-lower alkylaminophenyl, m-lower alkanoylaminophenyl and p-lower alkanoylaminophenyl, $n$ is an integer from 1–2, and $R_1$ is a member selected from the group consisting of amino, mono lower alkylamino, di-lower alkylamino and morpholino; and non-toxic acid addition salts thereof.

2. 3 - p - acetylaminophenyl-5-diethylaminomethyl-1,2,4-oxadiazole.

3. 3 - m - acetylaminophenyl-5-diethylaminomethyl-1,2,4-oxadiazole.

4. 3 - p - acetylaminophenyl-5-morpholinomethyl-1,2,4-oxadiazole.

5. 3 - p - butyrylaminophenyl-5-morpholinomethyl-1,2,4-oxadiazole.

6. 3 - m - acetylaminophenyl-5-morpholinomethyl-1,2,4-oxadiazole.

References Cited by the Examiner

UNITED STATES PATENTS

| | | | |
|---|---|---|---|
| 2,966,491 | 12/1960 | Pfister et al. | 260—294.3 |
| 3,141,019 | 7/1964 | Palazzo et al. | 260—247.5 |

NICHOLAS S. RIZZO, *Primary Examiner.*

WALTER A. MODANCE, *Examiner.*